United States Patent [19]

Poll et al.

[11] Patent Number: 4,843,140

[45] Date of Patent: Jun. 27, 1989

[54] AROMATIC POLYESTERS BASED ON PHENOXYTEREPHTHALIC ACID, AND METHODS OF MANUFACTURING AND USING SAME

[75] Inventors: Heinz-Guenter Poll, Hilden; Martin Bartmann, Recklinghausen, both of Fed. Rep. of Germany

[73] Assignee: Huels Aktiengesellschaft, Marl, Fed. Rep. of Germany

[21] Appl. No.: 133,334

[22] Filed: Dec. 15, 1987

[30] Foreign Application Priority Data

Mar. 31, 1987 [DE] Fed. Rep. of Germany ....... 3710643

[51] Int. Cl.$^4$ ............................................. C08G 63/00
[52] U.S. Cl. ..................................... 528/176; 528/180; 528/181; 528/191; 528/194; 528/195; 528/206; 528/271; 252/299.01
[58] Field of Search ............... 528/176, 125, 180, 181, 528/191, 194, 195, 206, 271; 252/299.01

[56] References Cited

U.S. PATENT DOCUMENTS 3,723,388  3/1973  Bell et al. ............................. 260/47

*Primary Examiner*—John Kight
*Assistant Examiner*—Samuel A. Acquah
*Attorney, Agent, or Firm*—Oblon, Fisher, Spivak, McClelland & Maier

[57] ABSTRACT

Aromatic polyesters based on phenoxyterephthalic acid, a method of manufacturing the same, and applications of the same. The inventive polyesters are based on phenoxyterephthalic acid, one or more other aromatic dicarboxylic acids, a dihydroxyaryl compound (with 2 OH groups attached to an aromatic ring), and an hydroxyaromatic carboxylic acid, are partially crystalline, form an anisotropic melt phase, and are processible at up to 360° C. The polyesters may be used for manufacturing pieces formed by molding, extrusion, or other standard forming techniques.

18 Claims, No Drawings

AROMATIC POLYESTERS BASED ON PHENOXYTEREPHTHALIC ACID, AND METHODS OF MANUFACTURING AND USING SAME

BACKGROUND OF THE INVENTION

1. Field of the Invention

The invention relates to thermotropic aromatic polyesters based on phenoxyterephthalic acid, another aromatic dicarboxylic acid, at least one aromatic hydroxycarboxylic acid, and at least one dihydroxyaryl compound.

2. Discussion of the Background

Aromatic polyesters have been known for a long time, and are regarded as high-temperature-stabile materials. The manufacture and use of such materials is described in the following literature, as an example: Eareckson, W. M., 1959, *J. Polym. Sci., XL,* 399; Bier, G., 1974, *Polymer,* 15, 527; Ciferri, A., Krigbaum, W. R., and Meyer, R. B., 1982, "Polymer Liquid Crystals", pub. Academic press, New York; and Erdemir, A. G., Johnson, D. J., and Tomka, J. G., 1986, *Polymer,* 27, 441.

Ger. OS No. 20 25 971 describes high molecular weight thermotropic polyesters based on aromatic dicarboxylic acids such as, e.g., terephthalic and isophthalic acids, dihydroxyaryl compounds such as, e.g., hydroquinone and 4,4'-dihydroxybiphenyl, and p-hydroxybenzoic acid. All these polyesters are difficult to process.

Copolyesters comprised of isophthalic acid and hydroquinone units to the extent of at least 80 mol % are described in Eur. OS No. 0 045 499. These polyesters can be molded or extruded, etc., in the melt.

A number of aromatic polyesters have excellent thermal stability, however their processing temperatures are so high that the polymer becomes colored and is partially decomposed. Problems also occur in the forming of the polyesters where there are high shear forces. In particular, the percentage of shrinkage in the processing direction differs markedly from that in the direction transverse to the processing direction. This problem is solved by polycondensing aromatic dicarboxylic acids and dihydroxyaryl compounds in the presence of a trifunctional compound, e.g., a dihydroxyaromatic monocarboxylic acid.

U.S. Pat. No. 3,723,388 describes polyesters based on dihydroxyaryl compounds (bisphenols) and a mixture of at least 10 mol % of a substituted phenoxyphthalic acid and 0-90 mol % of another aromatic dicarboxylic acid or a derivative of same. The underlying concept of U.S. Pat. No. 3,723,388 is that polyesters based on phenoxyphthalic acids can be processed at much lower temperatures than the corresponding esters of unsubstituted phthalic acids. For example, in the patent noted above there is a reference to the noncrystalline properties of a polyester based on phenoxyterephthalic acid and hydroquinone (see Example 5), but nothing is mentioned as to possible liquid crystalline properties.

Jap. No. 60/69,312 describes linear aromatic polyesters prepared from phenoxyterephthalic acid and bisphenols and having an inherent viscosity of at least 1.0. The phenoxyterephthalic acid in these polyesters optionally can be replaced to the extent of up to 20 mol %, preferably only up to 10 mol %, by other aromatic dicarboxylic acids. However, it is important that the carboxyl groups of these dicarboxylic acids are oppositely directed and parallel to each other, as is the case, e.g., in terephthalic acid. Also, the hydroxyl groups of the dihydroxyaryl compounds should be oppositely directed. While the possibility is mentioned of including hydroxycarboxylic acids in the monomer component, there is no experimental confirmation.

These polyesters are prepared in the presence of nonreactive (i.e., not participating in the reaction), high boiling compounds with molecular weight <1,000, required to reach the desired degree of polymerization of the polyesters and to avoid a decomposition of the polyesters at temperatures above the melting temperature. Following polycondensation and forming, the low molecular weight added agents must be extracted out of the finished molded (or otherwise formed) piece. This extraction process step, which may take up to 1 hr, is industrially extremely disadvantageous.

In Comparison Example 1 of Japanese No. 60/69,312 the preparation of a polyester by reacting phenoxyterephthalic acid diphenyl ester and hydroquinone is described. The polyester has a melting point of 320° C., but is first flowable at 405° C., at which temperature it decomposes. A specific statement is made that this polyester cannot be processed at temperatures below 400° C.

Thus, from the state of the art, aromatic polyesters based on terephthalic acid, hydroquinone, and p-hydroxybenzoic acid are known, as are aromatic polyesters based on phenoxyterephthalic acid and dihydroxyaryl compounds. However, liquid crystalline polyesters based on phenoxyterephthalic acid, one or more other dicarboxylic acids, dihydroxyaryl compounds, and aromatic hydroxycarboxylic acids are not yet known.

SUMMARY OF THE INVENTION

Accordingly, one object of the present invention is to provide partially crystalline polymers which are thermoplastically processible without problems.

A further object of the invention is to provide partially crystalline polymers with high molecular weights without the use of lower molecular weight compounds.

These and other objects of the invention which will become apparent from the following specification have been achieved by the partially crystalline aromatic polymer of the present invention which is processible and melts at temperatures below 360° C. and which forms an anisotropic melt phase.

The partially crystalline polymer of the present invention is comprised of a component A which is a mixture of 10-80 mol % of a phenoxyterephthalic acid and 90-20 mol % of at least one other aromatic dicarboxylic acid; a component B comprising one or more compounds with two OH groups attached to an aromatic ring; and a component C comprising one or more hydroxyaromatic carboxylic acids.

DETAILED DESCRIPTION OF THE PREFERRED EMBODIMENTS

It is surprising to find partially crystalline aromatic polyesters with a melting point below 360° C. which form an anisotropic melt phase and are processible below 360° C.

Such polyesters are obtainable by reacting components A, B, and C, with

A being a mixture of a phenoxyterephthalic acid in the amount of 10-80 mol % and at least one other aromatic dicarboxylic acid in the amount of 90–20 mol %;

B being one or more compounds with 2 OH groups attached to an aromatic ring; and C being one or more hydroxyaromatic carboxylic acids.

The phenoxyterephthalic acid in component A has the general formula

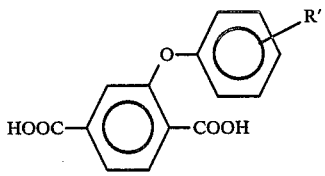

where R' represents hydrogen, halogen, or an alkyl, aryl, alkyloxy, or aryloxy group with up to 12 carbon atoms.

Preferred polyesters are those containing 0.1–5 mol, preferably 0.5–3 mol, of the hydroxyaromatic carboxylic acid per mole of the mixture A. The mole ratio of A:B is 0.9–1.1, preferably 0.95–1.05.

The invention also includes methods of manufacturing these polyesters and the use of the polyesters for manufacturing parts by molding, extrusion, or other standard forming techniques.

The following advantages are achieved with the invention:

1. In contrast to Jap. No. 60/69,132, high molecular weight products can be obtained without resort to the use of lower molecular weight compounds, and the products obtained can be melted without decomposition;

2. The polyesters can be thermoplastically processed without problems.

Component A is a mixture of a phenoxyterephthalic acid (in the amount of 10–80 mol %) and at least one other aromatic dicarboxylic acid (in the amount of 90–20 mol %).

Phenoxyterephthalic acid (R'=H) is easily produced (See 1986 *J. Polym. Sci. Polym. Chem. Ed.*, 18, 3069), and is the preferred ingredient. The substituted phenoxyterephthalic acids can be prepared easily by, for example, reacting nitrophthalic acid with the corresponding substituted phenols.

Candidates for use as the other aromatic dicarboxylic acids in component A include: (a) terephthalic acid and/or isophthalic acid; (b) naphthalenedicarboxylic acids, such as 1,4-, 1,5-, 2,6-, and 2,7-naphthalenedicarboxylic acid; and (c) aromatic dicarboxylic acids of general formula

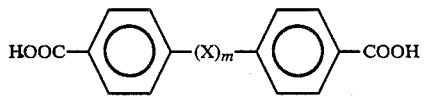

where X represents —O—, —S—, —SO$_2$—, —CO—, —CH$_2$—, or —C(CH$_3$)$_2$—, and m=0 or 1. The preferred aromatic dicarboxylic acids have m=0, or m=1 and X is —CO—.

Component B contains two OH groups attached to an aromatic ring. Particularly suitable are the following dihydroxyaryl compounds:

(a) hydroquinones and resorcinols of the following formulas:

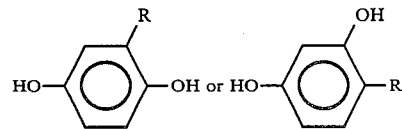

where R represents H, Br, Cl, or an aryl, alkyl, aralkyl, aryloxy, alkyloxy, or acyl group, with at most 12 carbon atoms;

(b) dihydroxynaphthalenes, such as 1,4-, 1,5-, 2,6-, and 2,7-dihydroxynaphthalene;

(c) bisphenols of general formula

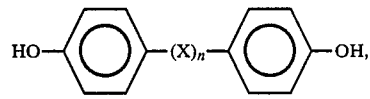

where X has the same meaning as above, and n=0 or 1. Preferred as component B are hydroquinone and 4,4'-dihydroxybiphenyl.

Component C is an hydroxyaromatic carboxylic acid. Ordinarily it has the structure

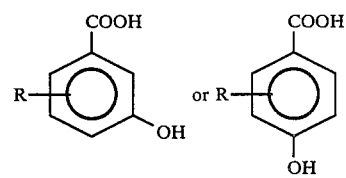

where R has one of the above-presented meanings. Also suitable as component C are hydroxynaphthoic acids, which also may have the above-mentioned R as a substituent. Preferred as component C is 4-hydroxybenzoic acid. The amount of component C used per mole of mixture A is 0.1–5 mol, preferably 0.5–3 mol.

The following methods may be used to manufacture the polyesters:

1. Reacting the phenyl esters of components A and C with component B (See Bier, G., 1974, *Polymer*, 15, 527).

2. Reacting the acyl chloride form of mixture A and the acyl chloride form of C with the component B. The reaction is ordinarily carried out in methylene chloride or analogous solvents (see Bier, G., ibid).

3. Reacting the acid mixture A with the acylated form of dihydroxyaryl compound B and the acylated form of hydroxycarboxylic acids C.

The acylating agent used is butanoic anhydride propanoic anhydride or preferably acetic anhydride. The acylation may be carried out prior to the polycondensation in a separate reactor, or the mixture of components A, B, and C can be heated in the presence of the acylating agent and the acylated compounds can be prepared in situ. In this case, the acetic anhydride should be employed in at least an equivalent amount based on the number of phenolic OH groups present. Ordinarily the temperature during the reaction is between 140° and 350° C., preferably between 250° and 320° C. The pressure is not of critical importance.

Preferably, the polycondensation is carried out in the melt.

The polycondensation can be carried out in the presence of catalysts. Suitable catalysts (as is per se known) are alkali or alkaline earth acetates, zinc acetate, germanium dioxide, antimony trioxide, organotin compounds, and titanium and zirconium alcoholates. The catalyst concentration is 0.001-0.5 wt. %, preferably 0.01-0.1 wt. %. The molecular weight of the polyester product can be increased by further condensation in the solid phase.

The inventive polyesters can be processed into molded, extruded, or other formed pieces, fibers, or films, using standard equipment. They may have added to them the usual additive materials, stabilizers, and fillers, e.g. glass or carbon fibers, mineral materials, UV stabilizers, and/or antioxidants.

The values of the reduced viscosity $$\eta_{red} = (\eta_{rel} - 1)/c$$

were determined in a solvent mixture comprised of 50 wt. % phenol and 50 wt. % o-dichlorobenzene, at 23° C., with the concentration of the polyester at 5 g/liter.

The values of the glass temperature (Tg) and melting point (Tm) were determined on a differential scanning calorimeter (DSC) (type FP 800, supplied by Mettler).

The investigation of the liquid crystal properties was performed on a Leitz-Orthoplan polarization microscope with 13× objective magnification, in combination with a Mettler hot stage (type FP 52) equipped for operation at temperatures up to 380° C.

Other features of the invention will become apparent in the course of the following descriptions of exemplary embodiments which are given for illustration of the invention and are not intended to be limiting thereof.

EXAMPLES

Example 1

7.7 g (0.03 mol) phenoxyterephthalic acid, 3.3 g (0.02 mol) isophthalic acid, 5.5 g (0.05 mol) hydroquinone, 6.9 g (0.05 mol) 4-hydroxybenzoic acid, and 25.5 g (0.25 mol) acetic anhydride were mixed together and heated to 260° C. under a protective gas. After 30 min at 260° C., the mixture was held 15 min each at 280°, 300°, and 320° C., whereby acetic acid and excess acetic anhydride were distilled off. To complete the reaction, a vacuum of 0.1 mbar was applied at 320° C. for 1 hr. The resulting polyester had a reduced viscosity $\eta_{red}$=1.05. The glass temperature was 123° C., the melting point 348° C. Above the melting point, with crossed polarizers in the polarization microscope the polyester showed a schlieren texture of a type which is typical of liquid crystalline compounds. The melt of the polyester was anisotropic at 380° C.

EXAMPLES 2 to 8

The method in Examples 2 to 8 was analogous to that of Example 1.

The compositions and properties of the polyesters are summarized in Table 1.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A partially crystalline aromatic polymer with melting point <360° C., which forms an anisotropic melt phase and is processable at <360° C., said polymer comprising:
   (a) component A, comprising a mixture of 10-80 mol % a phenoxyterephthalic acid and 90-20 mol % of at least one other aromatic dicarboxylic acid said phenoxyterephthalic acid being of the formula

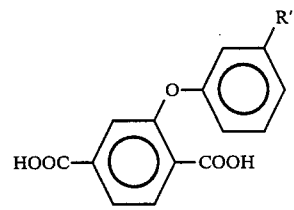

where R' is hydrogen, halogen, or an alkyl, aryl, alkoxy, or aryloxy group with up to 12 carbon atoms;
   (b) component B, comprising one or more compounds with 2 OH groups attached to an aromatic ring; and
   (c) component C, comprising one or more hydroxyaromatic carboxylic acids.

2. The partially crystalline polymer of claim 1, wherein the mole ratio A:B is within the range 0.9-1.1.

3. The partially crystalline polymer of claim 2, wherein said ratio A:B is within the range 0.95-1.05.

4. The partially crystalline polymer of claim 2, comprising 0.1-5 moles of said hydroxyaromatic carboxylic acid per mole of said mixture A.

5. The partially crystalline polymer of claim 4, comprising 0.5-3 moles of said hydroxyaromatic carboxylic acid per mole of said mixture A.

6. The partially crystalline polymer of claim 1, wherein said mixture A comprises 20-80 mol % isophthalic acid.

TABLE 1

| Example No. | Phenoxy-terephthalic acid (mol) | Isophthalic acid (mol) | Terephthalic acid (mol) | Dihydroxyaryl compounds (mol) | | 4-Hydroxy-benzoic acid (mol) | Acetic anhydride (mol) | $\eta_{red}$ (dl/g) | Tg (glass temp., °C.) | Tm (melting point °C.) |
|---|---|---|---|---|---|---|---|---|---|---|
| | | | | Hydro-quinone | 4-4'-Dihydroxy-biphenyl | | | | | |
| 1 | 0.03 | 0.02 | — | 0.05 | — | 0.05 | 0.25 | 1.05 | 123 | 348 |
| 2 | 0.03 | 0.02 | — | 0.05 | — | 0.15 | 0.35 | —* | 121 | 352 |
| 3 | 0.03 | 0.02 | — | — | 0.05 | 0.15 | 0.35 | 1.49 | 132 | 338 |
| 4 | 0.01 | 0.04 | — | 0.05 | — | 0.10 | 0.30 | 1.52 | 129 | 272 |
| 5 | 0.01 | 0.04 | — | 0.05 | — | 0.15 | 0.35 | —* | 124 | 352 |
| 6 | 0.01 | 0.03 | 0.01 | 0.025 | 0.025 | 0.10 | 0.30 | 1.66 | 125 | 258 |
| 7 | 0.01 | 0.03 | 0.01 | 0.025 | 0.025 | 0.15 | 0.35 | —* | 139 | 310 |
| 8 | 0.01 | 0.04 | — | 0.025 | 0.025 | 0.10 | 0.30 | 1.70 | 130 | 311 |

*Insoluble in phenol/o-dichlorobenzene.

7. The partially crystalline polymer of claim 1, wherein R' is H.

8. The partially crystalline polymer of claim 1, wherein said hydroxyaromatic carboxylic acid is selected from the group consisting of terephthalic acid, isophthalic acid, naphthalenedicarboxylic acids, and aromatic dicarboxylic acids of the formula

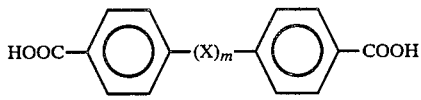

wherein X is —O—, —S—, —SO₂, —CO—, —CH₂—, or —C(CH₃)₂—, and m=0 or 1, or mixtures thereof.

9. The partially crystalline polymer of claim 1, wherein component B is selected from the group consisting of hydroquinones, resorcinols of the formula

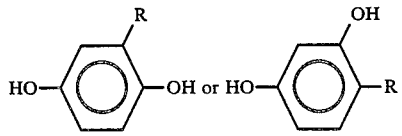

wherein R is H, Br, Cl, or an aryl, alkyl, aralkyl, aryloxy, alkyloxy, or acyl group with at most 12 carbon atoms; dihydroxynaphthalenes and bisphenols.

10. The partially crystalline polymer of claim 9, wherein component B is hydroquinone or 4,4'-dihydroxybiphenol.

11. The partially crystalline polymer of claim 1, wherein said hydroxyaromatic carboxylic acid is 4-hydroxybenzoic acid.

12. A method of manufacturing the partially crystalline polymer of claim 1, comprising the steps of:
reacting components A, B and C,
wherein component A comprises a mixture of 10-80 mol % of a phenoxyterephthlic acid and 90-20 mol % of at least one other aromatic dicarboxylic acid; component B comprises one or more compounds with two OH groups attached to an aromatic ring; and component C comprises one or more hydroxyaromatic carboxylic acids.

13. The method of claim 12, wherein said reacting of components A, B and C is carried out in the melt at a temperature of 140°-350° C.

14. The method of claim 13, wherein said reacting is carried out at a temperature of 250°-320° C.

15. The method of claim 12, wherein said reacting of components A, B and C is carried out in the presence of acetic anhydride in an amount at least sufficient to provide an acetic anhydride group for each OH group attached to an aromatic ring.

16. The method of claim 12, wherein said reacting step is carried out in the presence of a catalyst selected from the group consisting of alkali or alkaline earth acetates, zinc acetate, germanium dioxide, antimony trioxide, organotin compounds, titanium alcoholates and zirconium alcoholates.

17. The method of claim 16, wherein said catalyst is present in a concentration of 0.001-0.5 wt. %.

18. The method of claim 17, wherein said catalyst is present in an amount of 0.01-0.1 wt. %.

* * * * *